United States Patent
Suwa et al.

(10) Patent No.: US 7,077,670 B2
(45) Date of Patent: Jul. 18, 2006

(54) ELECTRONIC COMPONENT STORING CASE AND ELECTRONIC DEVICE

(75) Inventors: Kaname Suwa, Kanagawa (JP); Masahiro Ando, Kanagawa (JP); Tadaaki Tomikawa, Kanagawa (JP)

(73) Assignees: Canon Kabushiki Kaisha, Tokyo (JP); Hitachi, Ltd., Tokyo (JP)

( * ) Notice: Subject to any disclaimer, the term of this patent is extended or adjusted under 35 U.S.C. 154(b) by 132 days.

(21) Appl. No.: 10/802,822

(22) Filed: Mar. 18, 2004

(65) Prior Publication Data
US 2004/0224544 A1 Nov. 11, 2004

(30) Foreign Application Priority Data
Mar. 20, 2003 (JP) ........................ 2003-077891

(51) Int. Cl.
*H01R 13/44* (2006.01)

(52) U.S. Cl. ........................ 439/138; 361/684
(58) Field of Classification Search ............ 439/138, 439/139, 142, 140, 137, 136; 361/683–686, 361/617; 385/76, 139
See application file for complete search history.

(56) References Cited

U.S. PATENT DOCUMENTS

| | | | | |
|---|---|---|---|---|
| 5,716,224 A | * | 2/1998 | Masuda et al. | 439/138 |
| 5,885,095 A | * | 3/1999 | Cohen et al. | 439/138 |
| 6,109,940 A | | 8/2000 | Chad et al. | 439/141 |
| 6,305,955 B1 | * | 10/2001 | Billman | 439/138 |
| 6,368,122 B1 | * | 4/2002 | Billman | 439/138 |
| 6,454,580 B1 | * | 9/2002 | Hwang | 439/138 |
| 6,666,724 B1 | * | 12/2003 | Lwee | 439/630 |
| 2003/0073350 A1 | | 4/2003 | Shimada | 439/630 |

FOREIGN PATENT DOCUMENTS

| | | |
|---|---|---|
| JP | 1-91579 | 6/1989 |
| JP | 11-8010 | 1/1999 |
| JP | 2001-291382 | 10/2001 |

* cited by examiner

*Primary Examiner*—Gary Paumen
(74) *Attorney, Agent, or Firm*—Fitzpatrick, Cella, Harper & Scinto

(57) ABSTRACT

An electronic component storing case capable of accommodating an electronic component includes a case member having an opening in its first end face, a shutter member which is arranged in the opening of the case member, pivotal outwardly to open/close the opening, and biased in a closing direction by a first resilient member, and a lever member which has a first end extending to an outside of the case member from at least its one side surface perpendicular to the first end face of the case member, and a second end which acts on the shutter member. The lever member converts an operating force to be applied to the first end into a biasing force for biasing the shutter member in an opening direction.

12 Claims, 14 Drawing Sheets

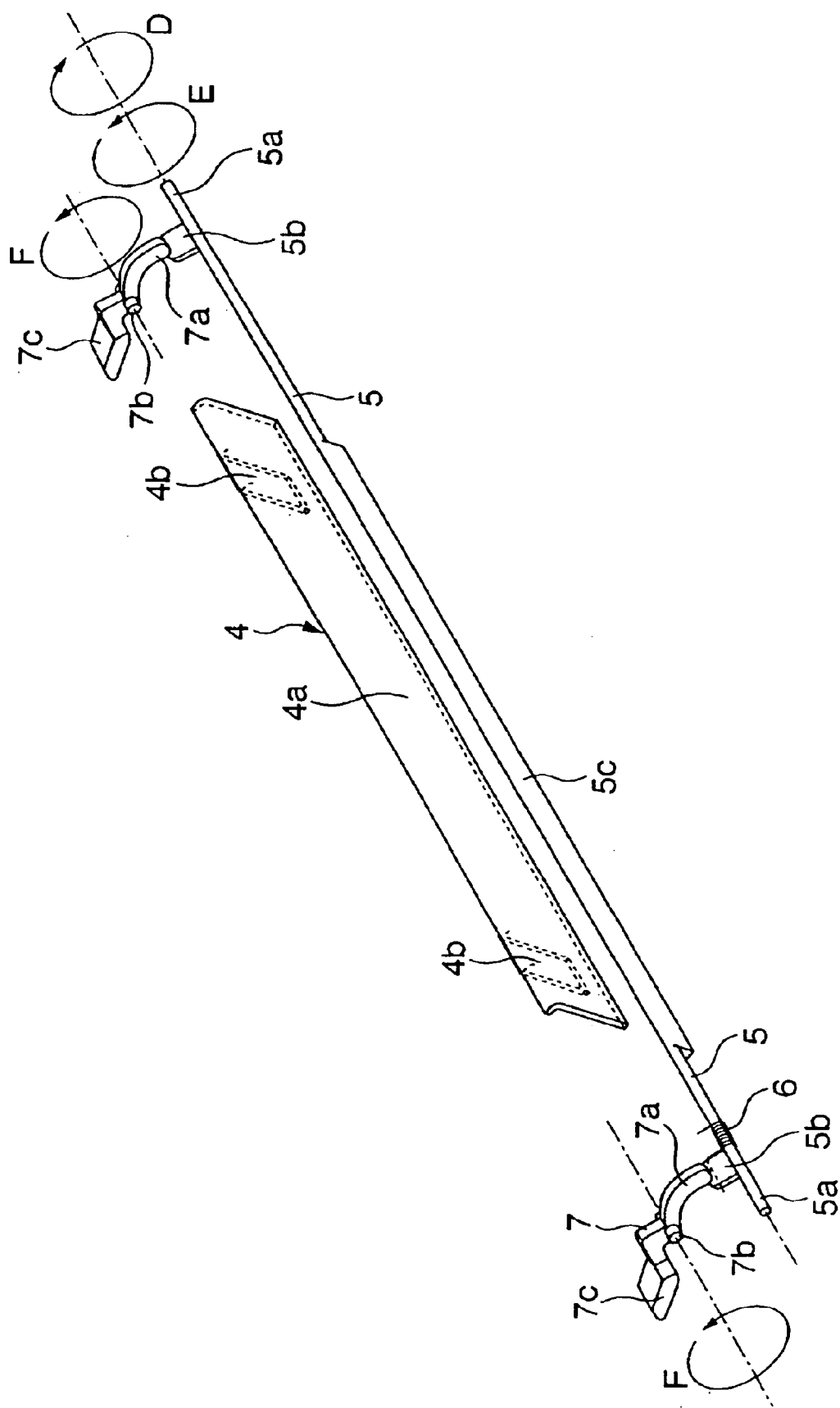

ELECTRONIC COMPONENT STORING CASE AND ELECTRONIC DEVICE

FIELD OF THE INVENTION

The present invention relates to a connection structure for electrically connecting an electronic equipment main body having an information processing function and an electronic device incorporating a storage medium or electronic component therein to each other and, more particularly, to a shutter opening/closing structure for a connection interface connector in a portable electronic device which is detachably connected to an electronic equipment main body.

BACKGROUND OF THE INVENTION

In general, as a recording medium often used by electronic equipment such as a personal computer (PC) having an information processing function, a semiconductor recording medium, magnetic recording medium, a magneto-optical storage medium or the like which holds information therein is used. Digital data to be recorded and accumulated in such a recording medium is not limited to text data consisting of characters, but also includes still images of a digital still camera and voice data and large-volume moving images sent from a digital video camera.

As equipment that records and stores TV broadcast programs and the like, a video tape recorder (VTR) which uses a video tape as a recording medium is popular. Recently, a recording scheme that uses a rotary magneto-optical storage medium such as a so-called DVD has become available. As a recording medium to be used in equipment of this type, a hard disk drive (to be referred to as a HDD hereinafter) which uses one type of magnetic recording medium attracts attention. This is because the HDD has a faster access speed, a lower recording bit unit price, and a larger recording capacity than those of other schemes. Currently, equipment has appeared which incorporates a HDD having a several ten gigabyte-class recording capacity so that it can record a comparatively long broadcast while having a function that cannot be conventionally obtained.

When the volume of data to be recorded increases, if the recording medium is stationarily incorporated in the equipment and cannot be replaced easily, the capacity becomes short, and new data cannot be additionally recorded unless overwriting it on the recorded data. Particularly, with a recording method in which a process such as MPEG (Moving Picture Experts Group) compression is not performed, the problem of the short capacity of the recording medium is obvious.

In order to cope with this problem, an electronic device such as a removable HDD that can be mounted in and removed from the electronic equipment main body easily has been proposed. For example, Japanese Patent Laid-Open No. 2001-291382 discloses an HDD that can be mounted and removed easily by an end user. According to this disclosure, a connecting connector is arranged at the front end of the HDD to be inserted in an electronic equipment main body. Guide grooves are formed in the side surfaces of the HDD in the inserting direction, so that the mounting/removing operability is improved.

With the HDD of Japanese Patent Laid-Open No. 2001-291382, however, when the HDD is removed from the electronic equipment main body, its connector serving as the interface exposes. Then, the HDD becomes unguarded against dust or static electricity accumulated in the human body, or a metal piece or the like may accidentally come into contact with the connector to damage the electronic circuit in the HDD. In particular, with a removable HDD incorporating a small HDD, since it is often removed and carried around because of its excellent portability, the problem described above is more obvious.

In view of these problems, generally, countermeasures have been often taken, as shown in FIG. 13 e.g., an opening/closing lid 11 is provided at the front surface of an interface connector packaged in an electronic equipment main body or a removable electronic device. The opening/closing lid 11 is arranged to oppose an opening in which a connector 13 is to be inserted, and is biased in a closed state by a spring (not shown) or the like. When the connector 13 is inserted in the opening, the opening/closing lid 11 is pushed open against the spring, so that the connector 13 is connected to a connector 12.

If the lid opens toward the interior of the electronic equipment main body or electronic device, the connector 12 arranged inside the electronic equipment main body or electronic device cannot be packaged within the pivot range of the opening/closing lid 11, but must be arranged at a position where it does not interfere with the opening/closing lid 11. Accordingly, the outer shape of the electronic device increases. This is disadvantageous in equipment whose portability is the primary concern. Also, the fitting length of the connection-side connector 13 inevitably becomes large. In connection of equipments that perform high-speed serial transmission with a transmission frequency of several gigabits/sec to several ten gigabits/sec, not only the signal transmission energy loss increases, but also the impedance mismatch tends to easily occur, and ambient noise tends to be picked up easily to increase the jitter. As a result, high-speed signal transmission suffers.

As a prior art, FIG. 14 shows a scheme disclosed in Japanese Patent Laid-Open No. 11-008010. According to this scheme, a tapered portion is formed on the distal end of a connector 15 which is to be connected to a connector 14. Shutters 16 are arranged at the opening of a cabinet (electronic device) and open and close perpendicularly to the inserting direction of the connector 15. The shutters 16 are biased by springs 17 in closing directions. To connect the connectors 14 and 15 to each other, the shutters 16 provided to the cabinet are pushed away to slide, by the tapered portion of the connector 15, in directions perpendicular to the inserting direction. This structure is excellent in high-speed data transfer, because the displacement of the shutters 16 does not adversely affect the length of the connector inserting portion. However, a component of force perpendicular to the inserting force is generated by the tapered portion of the connector 15 and opens the slide shutters 16. Thus, slide friction acts, and the perpendicular component of force acts to open the shutters 16 against the biasing springs 17. Therefore, a larger opening force is required than with an ordinary connector.

The shutters 16 that open and close in the directions perpendicular to the connector inserting direction require storing spaces when the shutters are to be moved, and a structure in which the biasing springs and movement guide portions serving as slide guides are arranged, in the vicinity of the opening. If the structure as shown in FIG. 14 is employed in portable equipment or the like, the portable equipment becomes very thick in a direction perpendicular to the inserting/mounting direction, and the portability suffers. When identical shutter structures must be arranged vertically adjacent to each other in a multiple of levels, an unwanted space further increases, and the whole equipment cannot but become large. Even if the mating portion of the shutters has an introducing guide shape, the entire region of the distal end of the tapered portion must be precisely aligned with the mating portion of the closed shutters. Thus, the larger the number of connection terminals, the higher the required alignment accuracy. The resultant structure becomes very difficult to open and close, which is not practical.

SUMMARY OF THE INVENTION

The present invention has been made in view of the problems described above, and has as its object to make it possible to arrange an electronic device at a position close to the casing of the housing while providing a shutter that protects the connector from the outside when the electronic device is removed from the main body equipment.

In order to solve the above problems, an electronic component storing case according to the present invention comprises the following arrangement. More specifically, according to one aspect of the present invention, there is provided an electronic component storing case comprising: a case member capable of accommodating an electronic component and having an opening in a first end face thereof; a shutter member which is arranged in the opening of the case member, pivotal outwardly to open/close the opening, and biased in a closing direction by a first resilient member; and a lever member which has a first end extending to an outside of the case member from at least one side surface thereof perpendicular to the first end face of the case member, and a second end which acts on the shutter member, the lever member being adapted to convert an operating force to be applied to the first end into a biasing force for biasing the shutter member in an opening direction.

In order to achieve the above object, according to the present invention, there is also provided an electronic device comprising an electronic component fixed in a case member of the electronic component storing case such that a connecting connector thereof opposes the shutter member, wherein when the shutter member is open, the connecting connector is so exposed as to be able to be connected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an exploded perspective view showing the structures of a shutter 4, shaft 5, torsion coil spring 6, and levers 7, and the mutual positional relationship among them;

DETAILED DESCRIPTION OF THE PREFERRED EMBODIMENTS

Preferred embodiments of the present invention will now be described in detail in accordance with the accompanying drawings.

Figure 1:
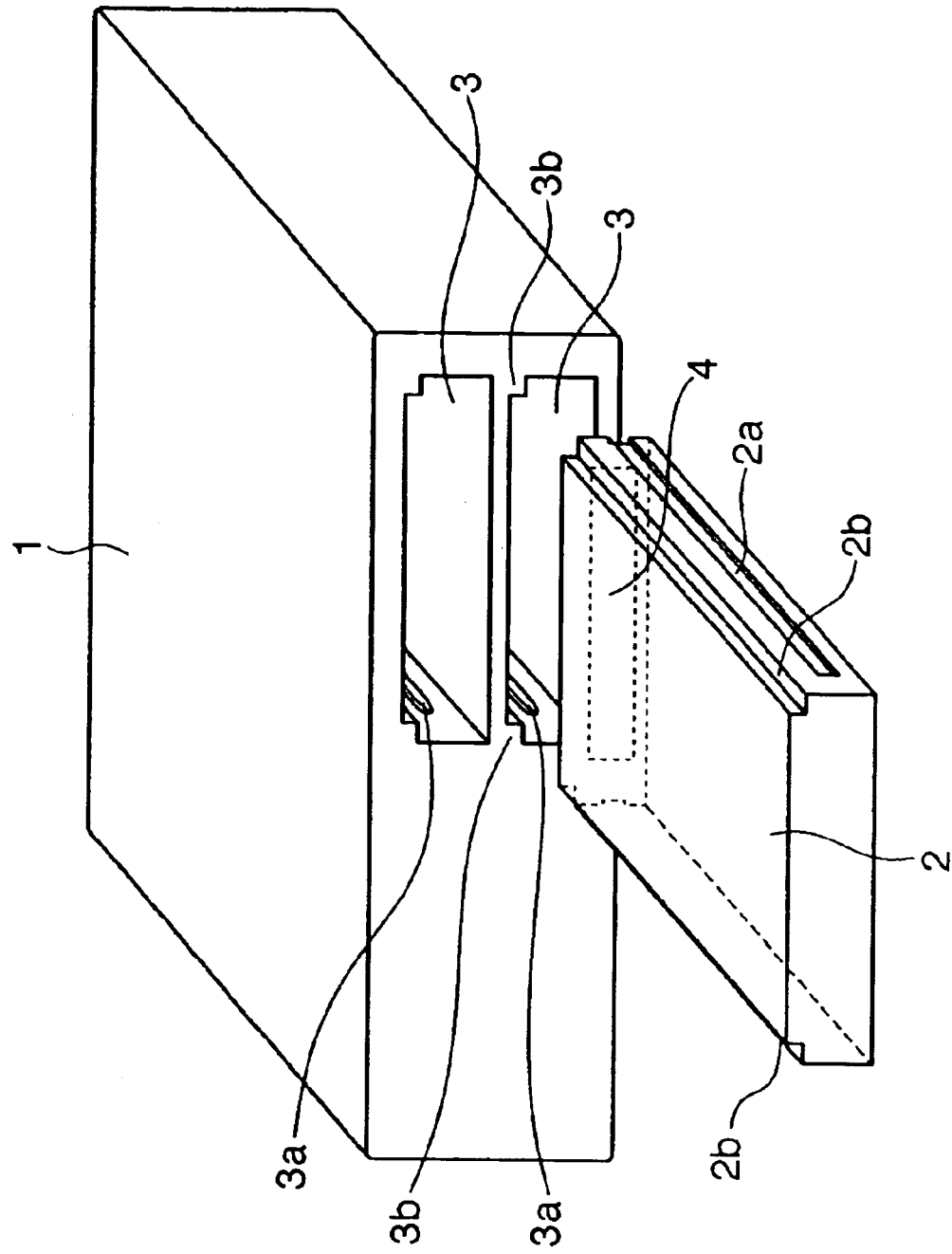
FIG. 1 is a view showing the entire arrangement of an electronic equipment system in which an electronic device 2 according to the present invention is to be mounted detachably.

FIG. 1 is a view showing the entire arrangement of an electronic equipment system in which an electronic device 2 incorporating a hard disk therein is to be detachably mounted in an electronic equipment main body 1. Referring to FIG. 1, two slots 3, in each of which the electronic device 2 is to be inserted and mounted, are formed in the front surface of the electronic equipment main body 1. The electronic device 2 is inserted in the electronic equipment main body 1 through the opening of the slot 3, so that a connecting connector provided in the electronic equipment main body 1 and a connector provided to the electronic device 2 are electrically connected to each other.

A shutter 4 is arranged at the distal end in the inserting direction of the electronic device 2. When the electronic device 2 is removed from the electronic equipment main body 1, the shutter 4 is held in the closed state, so that the connecting connector (to be described later) located in the electronic device 2 is protected. A pair of grooves 2a are formed in the two opposing side surfaces of the electronic device 2, to extend in the inserting/mounting direction. The grooves 2a in the two side surfaces of the electronic device 2 fit with a pair of rails 3a formed on the inner wall in the slot 3, so that the position of the electronic device 2 in the slot 3 is guided. Thus, when the connectors described above are fitted with each other, their mutual positions are held correctly, so that the connectors are connected electrically and mechanically. Prior to fitting and connection of the connectors, the shutter 4 described above is opened by a shutter opening/closing mechanism (to be described later in detail).

The grooves 2a are formed to extend from the distal end toward the rear portion of the inserting portion of the electronic device 2 with respect to the slot 3, and do not reach the rearmost portion but stop midway. With this structure, when the operator erroneously tries to insert the electronic device 2 in the slot 3 back to front, the electronic device 2 interferes with the distal ends of the rails 3a and thus will not be inserted.

Notches 2b are formed in the left and right corners of the upper surface of the electronic device 2 and extend in the inserting direction. Projections 3b are formed on the corners of the upper surface of the opening of the slot 3, at positions corresponding to the notches 2b. Even if the operator erroneously tries to insert the electronic device 2 upside down, the electronic device 2 will not be mounted upside down.

Figure 2:
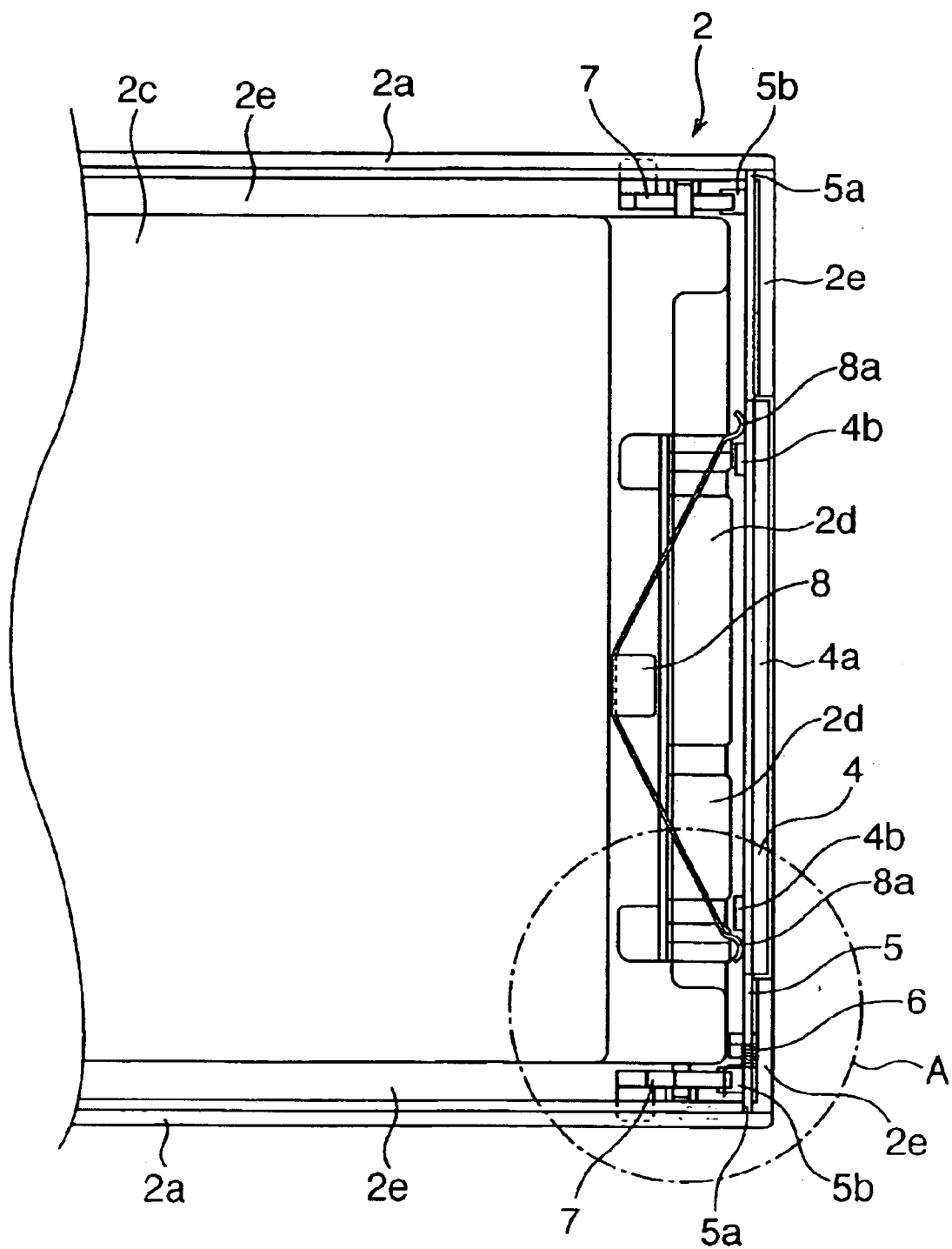
FIG. 2 is a plan view of the electronic device 2 from which its upper case covering its upper surface is removed in order to show its shutter portion structure.
Figure 3:
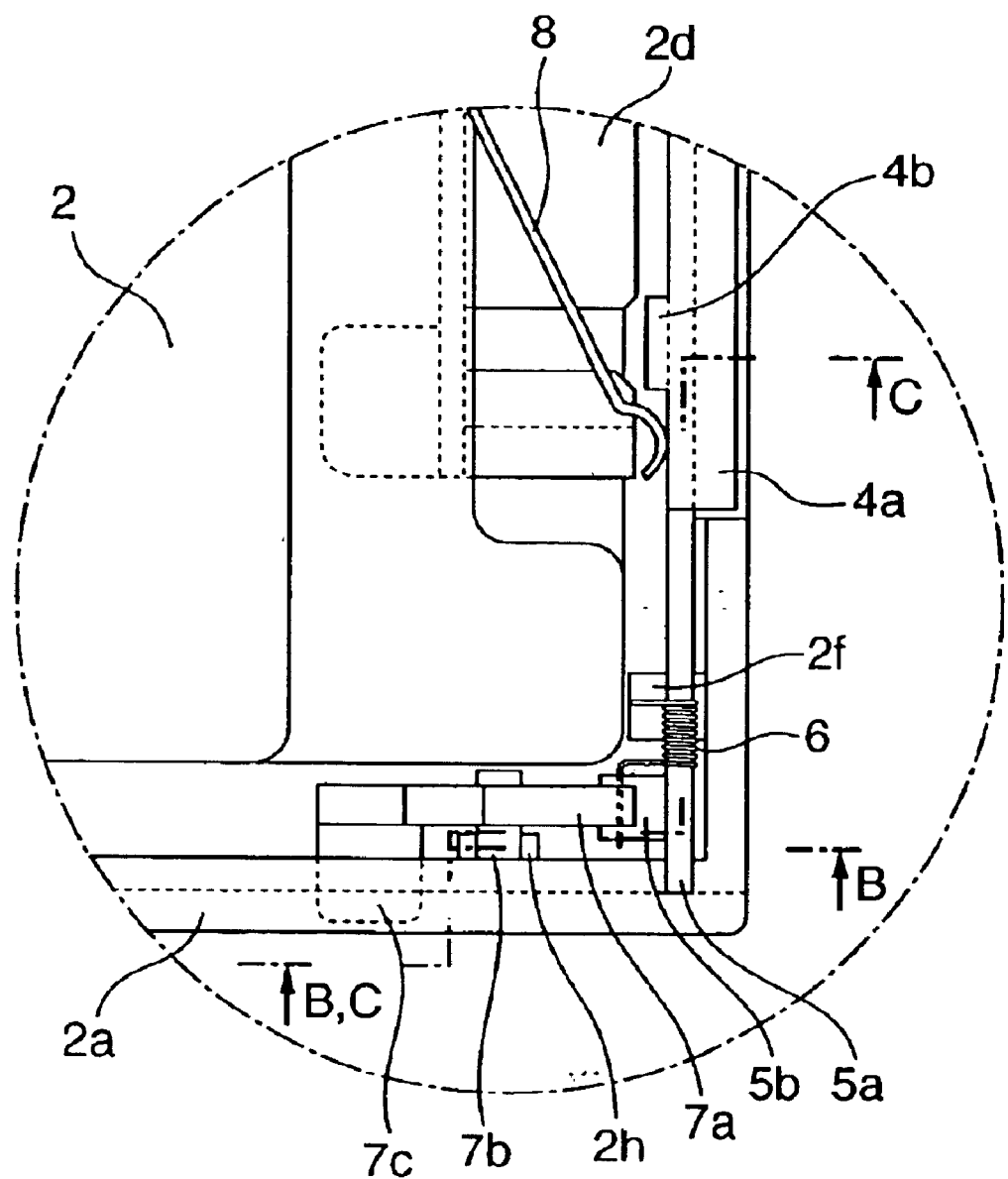
FIG. 3 is an enlarged view of the portion A of FIG. 2 in order to show a shutter opening/closing mechanism.
Figure 4:
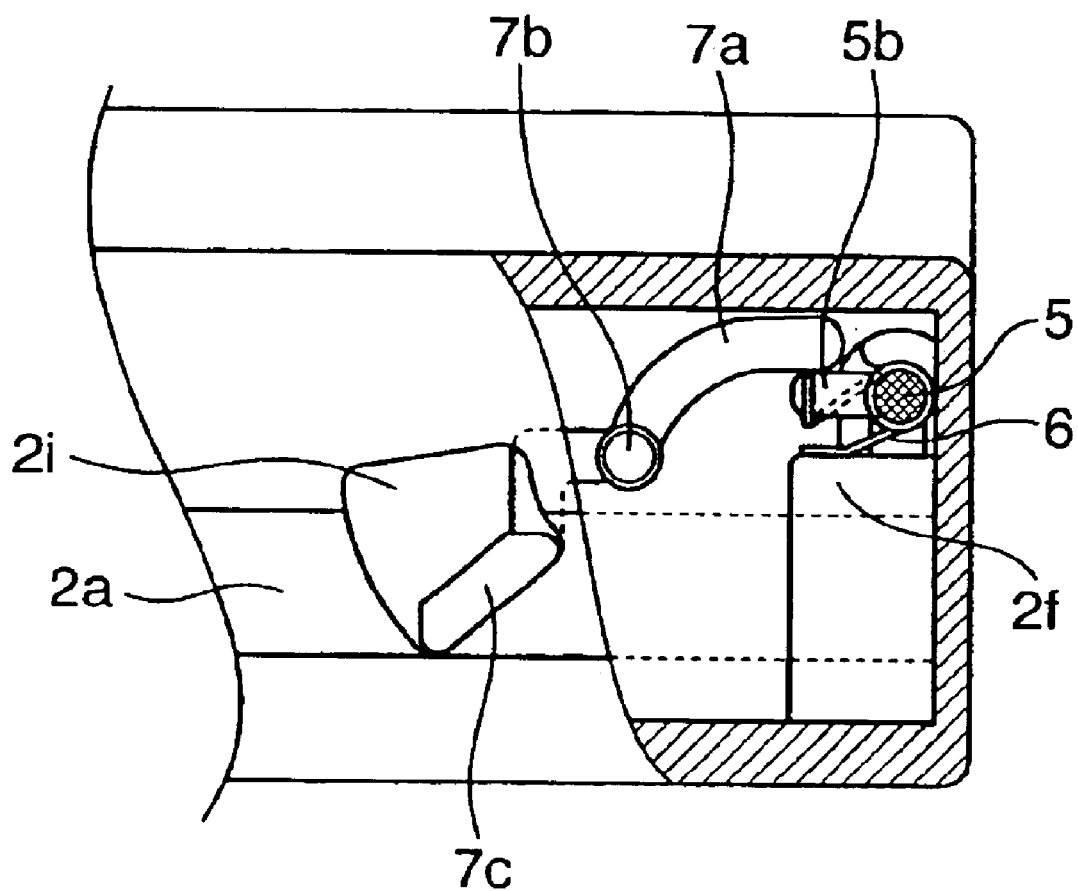
FIG. 4 is a sectional view of a portion taken along the line B—B of FIG. 3.

FIG. 2 is a view showing the internal structure of the electronic device 2, particularly the structure of the shutter portion. In FIG. 2, an upper case that covers the upper surface of the electronic device 2 is removed. FIG. 3 is an enlarged view of a portion A of FIG. 3. FIG. 4 is a sectional view of a portion taken along the line B—B of FIG. 3, and FIG. 5 is a sectional view of a portion taken along the line C—C of FIG. 3.

Referring to FIG. 2, reference numeral 2c denotes a hard disk drive (to be referred to as a HDD hereinafter) 2c serving as a storage medium. The HDD 2c holds and accumulates data in a rotary magnetic disk provided in it, and reads it, so that information can be updated and extracted. The HDD 2c is covered by a housing 2e of the electronic device 2 through a cushioning material which moderates a shock. Data exchange with the outside is performed through an interface connector 2d arranged at a position close to the distal end in the mounting direction of the outer edge in the housing. The shutter 4 is arranged at the outer edge that the connector 2d faces. The shutter 4 is usually closed, as shown in FIG. 5, and is biased in the closing direction by a torsion coil spring 6 shown in FIGS. 3 and 4. While the electronic device 2 is being inserted in the slot 3, the shutter 4 opens before it is connected to the connector of the electronic equipment main body 1, so that the connector 2d is exposed. This mechanism will be described later.

The shutter 4 is constituted by a front face plate 4a and rear arms 4b to have a U-shape. In the closed state shown in FIGS. 2, 3 and 5, when the shutter 4 is at a position where it forms an outer surface together with the housing 2e, the front face plate 4a forms the outer surface, and the rear arms 4b buckle toward the HDD 2c side so that a shaft 5 is clamped between them. The shaft 5 extends through the U-shape formed by the front face plate 4a and rear arms 4b, and is arranged such that its two ends 5a are held near the left and right grooves 2a of the housing to straddle the inside of the electronic device 2. The shaft 5 is locked and held at its two ends 5a having circular sections, such that it can rotate only toward the housing 2e. Two plate-like operating plates 5b are attached to project from the shaft core at positions close to the locking portions at the two ends of the shaft 5, such that they are almost horizontal in the state of FIG. 2. As shown in FIG. 4, one end of the torsion coil spring 6 is locked by the lower surface of the operating plate 5b. The other end of the torsion coil spring 6 is stopped by a shelf 2f formed on the case. The central coil portion of the torsion coil spring 6 is wound around the circular-section portion of the shaft 5. The two ends of the torsion coil spring 6 apply to the operating plate 5b a force in the loosening direction, that is, to rotate it clockwise about the shaft core as the center.

Figure 5:
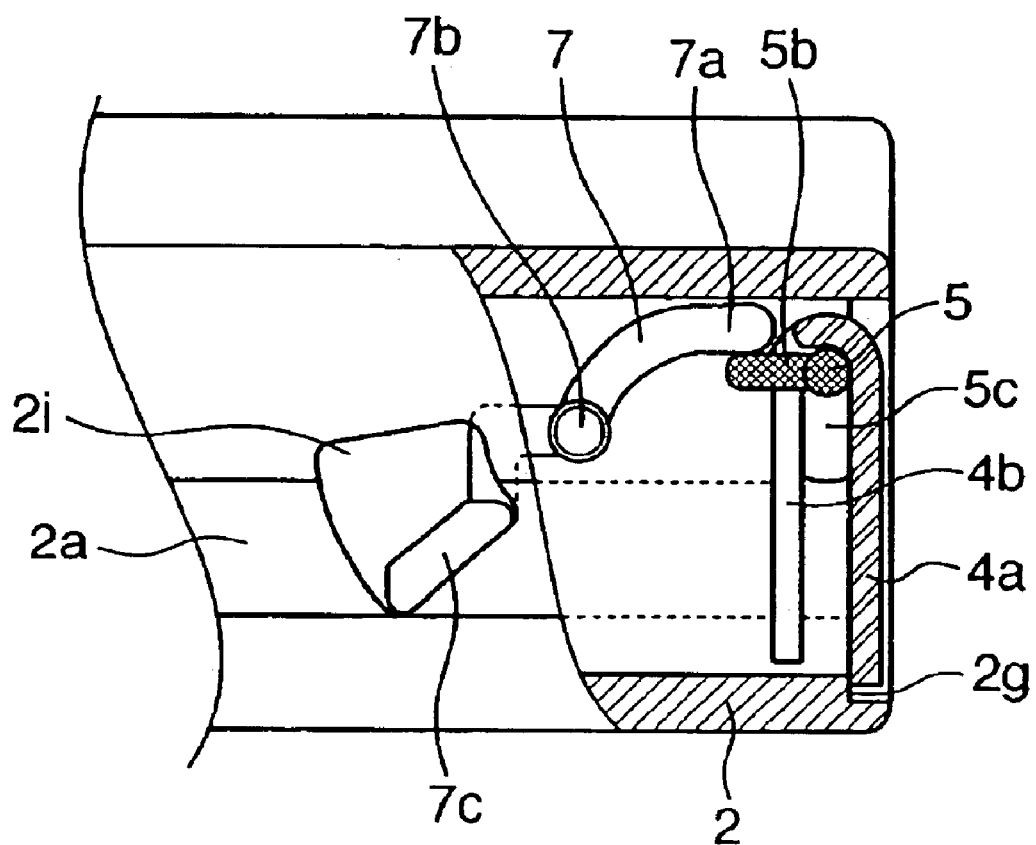
FIG. 5 is a sectional view of a portion taken along the line C—C of FIG. 3.

A rib-like guide plate 5c having a thickness substantially equal to the shaft diameter is integrally formed at the substantial central portion in the longitudinal direction of the shaft 5 to extend along the shaft core, and is interposed between the front face plate 4a and rear arms 4b of the shutter 4, as shown in FIG. 5. The loosening force of the torsion coil spring 6 applies a clockwise rotation force to the operating plates 5b. This rotation force is transmitted to the rib-like guide plate 5c. Thus, the shutter 4 receives the force in the clockwise direction in FIGS. 4 and 5 from the guide plate 5c due to the loosening force of the torsion coil spring 6 (described above). The distal end of the front face plate 4a abuts against a step 2g of the case 2, and is stopped. This is the closed state of the shutter 4. In the closed state, the outer surface of the front face plate 4a is slightly set back from the outer surface of the case 2. This provides the effect of eliminating any catch so that the shutter 4 will not be opened accidentally, and an advantage of causing the shutter 4 to be less adversely affected by an external force. When the shaft 5 rotates counterclockwise against the biasing force of the torsion coil spring 6, the shutter 4 is rotated by the guide plate 5c in the same direction as the shaft 5.

Referring to FIGS. 3 and 4, actuating ends 7a of levers 7 abut against the upper surfaces of the operating plates 5b arranged on the left and right sides, respectively, of the shaft 5, and rotating shafts 7b of the levers 7 are rotatably, axially supported by bearings 2h of the case 2. A to-be-operated portion 7c as the other end of each lever 7 projects outwardly through a fan-like hole 2i formed in the corresponding side surface of the case 2, and is located at a position where it partly blocks the corresponding groove 2a which is formed continuously. The to-be-operated portion 7c is located to block the groove 2a inclinedly with respect to the groove width, and its edge close to the rotating shaft 7b forms an inclined shape closer to the opening of the groove 2a. The lever 7 receives a force at its actuating end 7a due to the clockwise rotation force of the operating plate 5b received from the torsion coil spring 6, so that the lever 7 receives a counterclockwise rotation force about the rotating shaft 7b as the center. Therefore, the to-be-operated portion 7c is stopped as it abuts against one side of the fan-like hole 2i.

The structures of the shutter 4, shaft 5, torsion coil spring 6, and levers 7, and mutual positional relationship among them will be further described with reference to the exploded perspective view of FIG. 6 for the sake of better understanding. In FIG. 6, the shutter 4 and shaft 5 are drawn at separate positions. In the assembled state, as shown in the sectional view of FIG. 5, the shutter 4 is used in tight contact with the shaft 5, such that the guide plate 5c of the shaft is located in the U-shape recess formed by the front face plate 4a and rear arms 4b. The guide plate 5c of the shaft 5 is arranged over a long range at the central portion of the shaft 5. Alternatively, the guide plate 5c may include guide plates 5c arranged only at positions corresponding to the rear arms 4b. The shaft 5 has a circular section except the guide plate 5c and the operating plates 5b on its two sides. The two ends 5a of the shaft 5 are rotatably locked by the case 2, as described above, and a rotation force is applied to them from the torsion coil spring 6 in the direction of the arrow D of FIG. 6. The pair of left and right levers 7 having the rotating shafts 7b fixed to the case are axi-symmetrical, and respectively receive a rotation force in the direction of the arrow F of FIG. 6 from the corresponding left and right operating plates 5b. As described above, the outwardly projecting to-be-operated portions 7c of the levers 7 are stopped as they abut against the circumferential edges of the fan-like holes 2i of the upper case. Note that the shaft 5 is desirably made of a material having a comparatively large rigidity, e.g., a metal, because it is a thin, elongated member and constantly receives a torsion force.

A leaf spring denoted by reference numeral 8 in FIGS. 2 and 3 is fixed to the upper case 2, and is made of a flexible material such as a metal. Two resilient arms 8a extend from the central fixing portion of the leaf spring 8, and their distal ends are located at positions where they urge the rear portion of the shutter 4.

The process in mounting the electronic device 2 having the above arrangement in the electronic equipment main body 1, wherein the shutter 4 is opened from the closed state, the interface connectors are connected to each other, and a final storage state is achieved, will be described with reference to FIGS. 7A to 12.

Figure 7A:
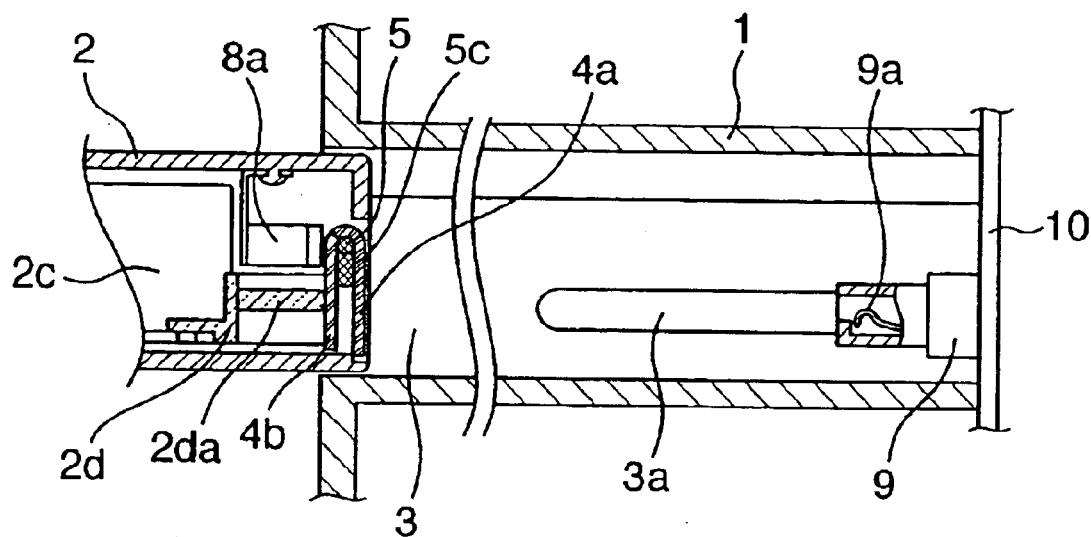
FIG. 7A is a view showing an initial state wherein the electronic device 2 is inserted in the slot of an equipment main body 1, and shows the positional relationship among a receptacle connector 9 of the equipment main body 1, a plug connector 2d and the shutter 4 of the electronic device 2, and a leaf spring 8.
Figure 7B:
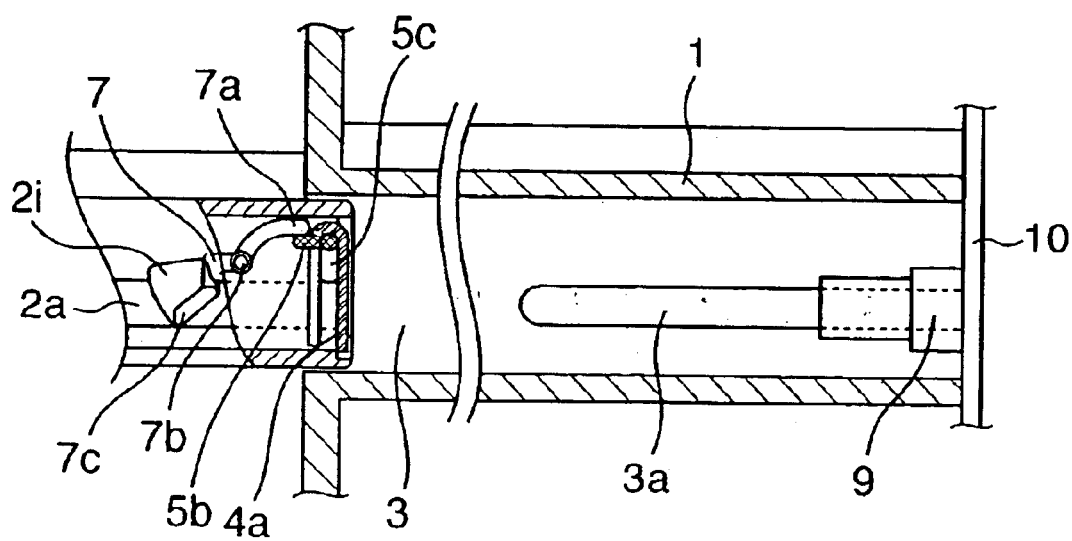
FIG. 7B is a view showing the initial state wherein the electronic device 2 is inserted in the slot of the equipment main body 1, and shows the relationship in motion of a portion where a guide rail 3a, a corresponding groove 2a of the electronic device 2, a to-be-operated portion 7c of the lever 7, and an operating plate 5b of the shaft 5 are arranged.

FIGS. 7A and 7B show the initial state wherein the electronic device 2 is inserted in the slot of the electronic equipment main body 1. FIG. 7A shows a portion where a receptacle connector 9 of the electronic equipment main body 1, the plug connector 2d and shutter 4 of the electronic device 2, the leaf spring 8, and the like are arranged. FIG. 7B shows a portion where the guide rail 3a and the corresponding groove 2a of the electronic device 2, the to-be-operated portion 7c of the lever 7, and the operating portion 5b of the shaft 5 are arranged. FIGS. 7A and 7B show comparison between two states wherein the electronic device 2 has been mounted with the same degree, in order to indicate the operational relationship among the respective components.

Figure 10A:
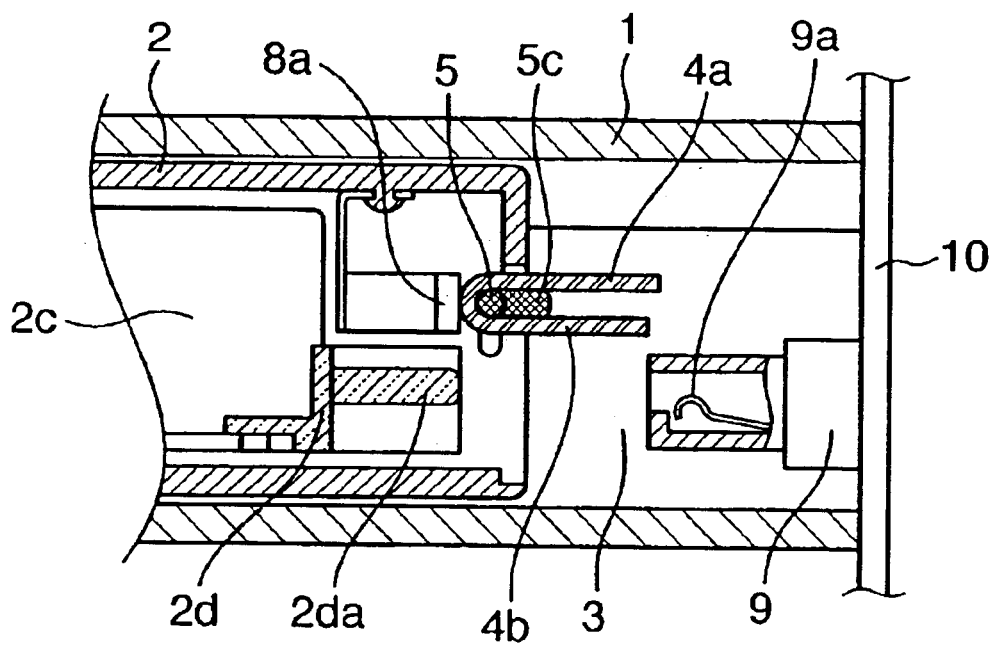
FIG. 10A is a view showing a state wherein the electronic device 2 has entered the slot 3 much more deeply than in FIG. 9, and shows the positional relationship among the receptacle connector 9 of the equipment main body 1, the plug connector 2d and shutter 4 of the electronic device 2, and the leaf spring 8.
Figure 10B:
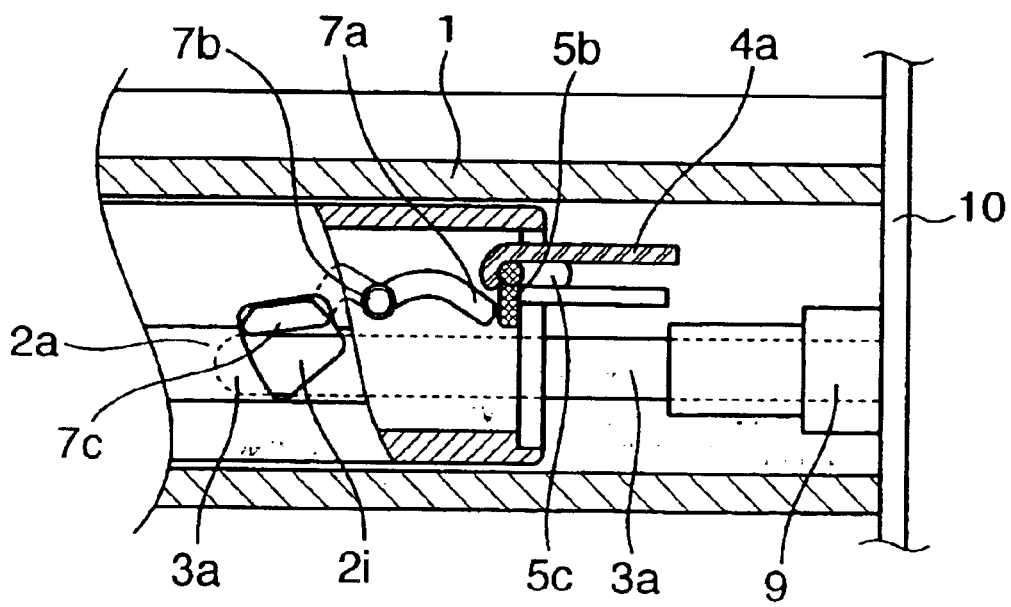
FIG. 10B is a view showing a state wherein the electronic device 2 has entered the slot 3 much more deeply than in FIG. 9, and shows the relationship in motion of a portion where the guide rail 3a, the corresponding groove 2a of the electronic device 2, the to-be-operated portion 7c of the lever 7, and the operating plate 5b of the shaft 5 are arranged.

FIGS. 10A and 10B also show the operational relationship for the same purpose, and are sectional views taken at the same portions as those of FIGS. 7A and 7B, respectively.

In FIG. 7B, the electronic device 2 is inserted in the opening inlet port of the slot 3, but the grooves 2a have not yet reached the distal ends of the rails 3a formed on the side surfaces of the slot 3 of the electronic equipment main body 1, and the levers 7 maintain the initial state. Thus, the shutter 4 is in the closed state of covering the front surface of the connector 2d. Hence, the electronic device 2 is in the same state as in FIG. 5 employed for explaining the structure of the electronic device 2 (described above). As shown in FIG. 7A, the receptacle connector 9 packaged on a substrate 10 is located at a deep position in the slot 3, and serves to relay a signal to the electronic equipment main body 1. A plurality of spring-like connection pieces 9a are arranged in the receptacle connector 9, and come into contact with contacts 2da of the connector 2d arranged in the electronic device 2, so that they are electrically connected.

Figure 8:
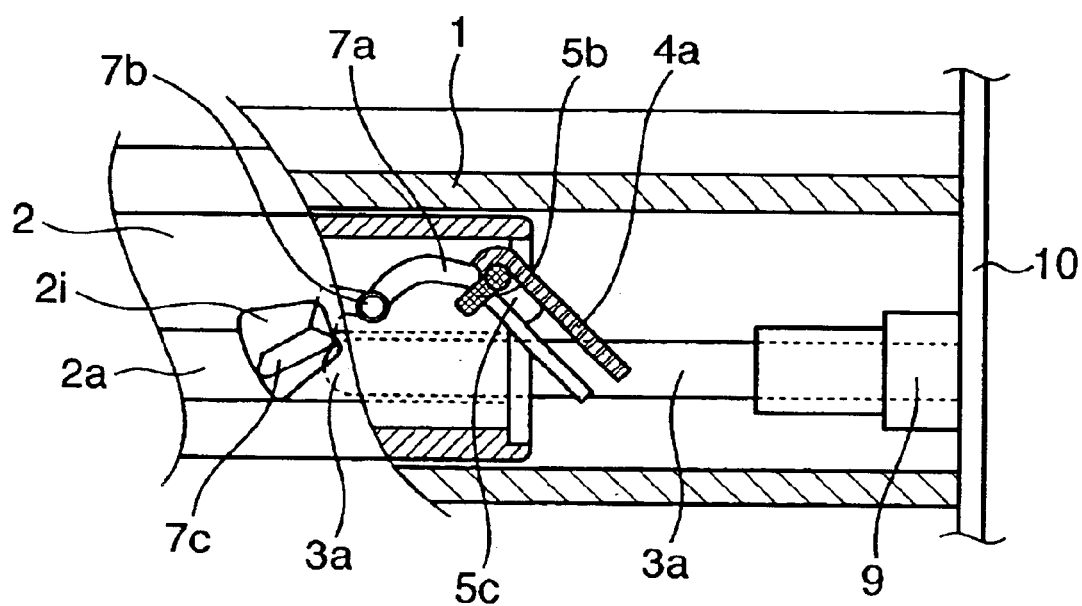
FIG. 8 is a view showing a state wherein the electronic device 2 has entered a slot 3 more deeply.

FIG. 8 shows a state wherein the electronic device 2 has entered the slot 3 more deeply. The rails 3a are fitted in the grooves 2a. The distal ends of the rails 3a come into contact with the to-be-operated portions 7c of the levers 7, and have moved to positions where they slightly push up the to-be-operated portions 7c. As described above, as the levers 7 are rotatably supported by the rotating shafts 7b, they rotate clockwise about the shaft cores as the centers. When the levers 7 rotate clockwise, as their distal ends 7a abut against the upper surfaces of the operating plates 5b of the shaft 5, the shaft 5 rotates counterclockwise, together with the guide plate 5c, about the shaft core as the center. The shutter 4 rotates through the same angle as that of the shaft 5 as it is guided by the guide plate 5c. In FIG. 8, as the shutter 4 starts rotation, it rotates forward by about 45° from the initial closed position, so that the connector is gradually exposed. As the connector is still located in the slot 3, it is less adversely affected by dust or static electricity. The upper portion of the shutter 4 is biased outwardly by the resilient arms 8a of the leaf spring 8. As the upper end of the shutter 4 has a circular section, the shutter 4 is rotated easily.

Figure 9:
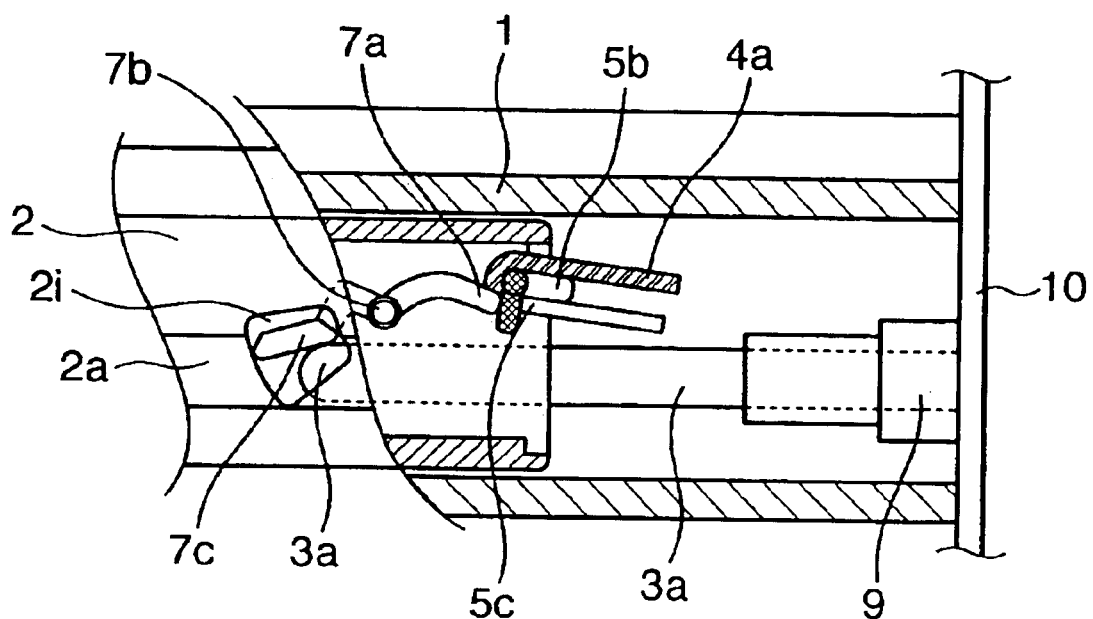
FIG. 9 is a view showing a state wherein the electronic device 2 has entered the slot 3 much more deeply than in FIG. 8.

FIG. 9 shows a state wherein the electronic device 2 has entered the slot 3 much more deeply than in FIG. 8. In this state, as the shaft 5 rotates, the shutter 4 is rotated forward by the guide plate 5c, and projects. However, the shutter 4 maintains such a positional relationship with the receptacle connector 9 arranged at the deepest position in the slot 3, that the shutter 4 will not interfere with the receptacle connector 9.

As shown in FIG. 10B, the guide rails 3a enter the grooves 2a, and push the to-be-operated portions 7c of the levers 7 completely, so that the to-be-operated portions 7c are displaced outside of the grooves 2a. In this state, the rotational displacement of the levers 7 becomes largest. As the operating plates 5b of the shaft 5 are rotated by the distal ends 7a of the levers 7, the shutter 4 rotates through almost 90° from its initial closed position, and is set horizontal. FIG. 10A shows the positional relationship between the two connectors. In FIG. 10A, the two connectors are still distant from each other, and are not electrically connected. As the shutter 4 is already opened completely, even if the electronic device 2 is guided by the rails 3a and enters the slot 3, it will not interfere with the receptacle connector 9. So far the shutter 4 only rotates about the slot 3 as the center and does not translate. Thus, the distal ends 8a of the leaf spring 8 are not substantially displaced by the shutter 4, and maintain the initial state of applying a horizontal resilient urging force to the shutter 4.

Figure 11:
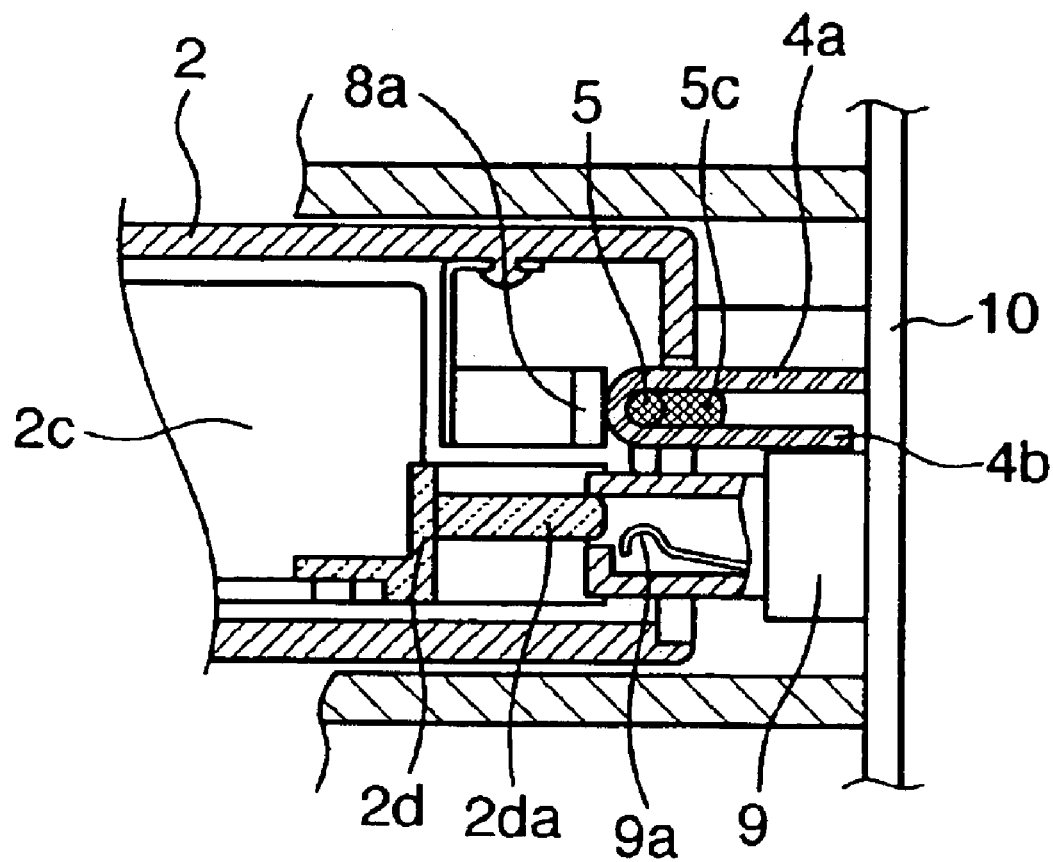
FIG. 11 is a view showing a state wherein the electronic device 2 has entered the slot 3 much more deeply than in FIG. 10.

FIG. 11 shows a state wherein the electronic device 2 has entered the slot 3 much more deeply and the connectors 2d and 9 have started to fit mechanically. In this state, the mounting board 10 of the receptacle connector 9 has abutted against the distal end of the shutter 4 which has opened in the horizontal state. After this, the shutter 4 displaces parallel to the inserting direction while it resiliently deforms the resilient arms 8a of the leaf spring 8 along the guide direction of the guide plate 5c of the shaft 5.

Figure 12:
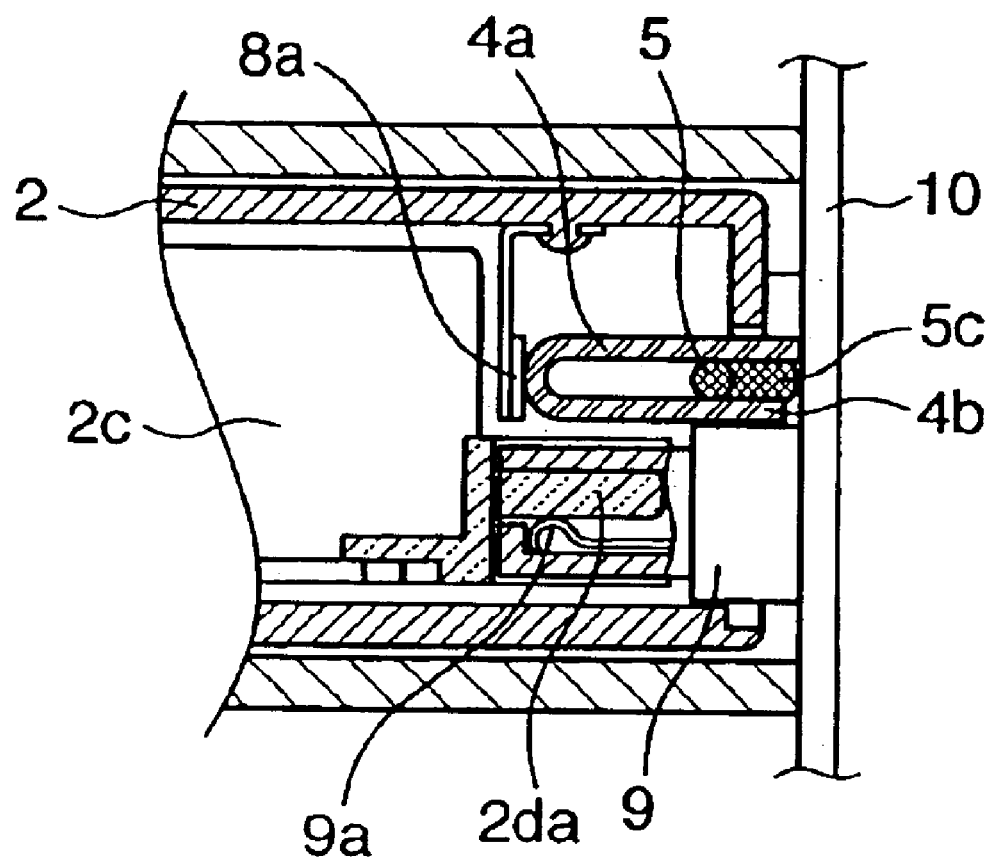
FIG. 12 is a view showing a state wherein the electronic device 2 is mounted in the slot 3 completely.
Figure 13:
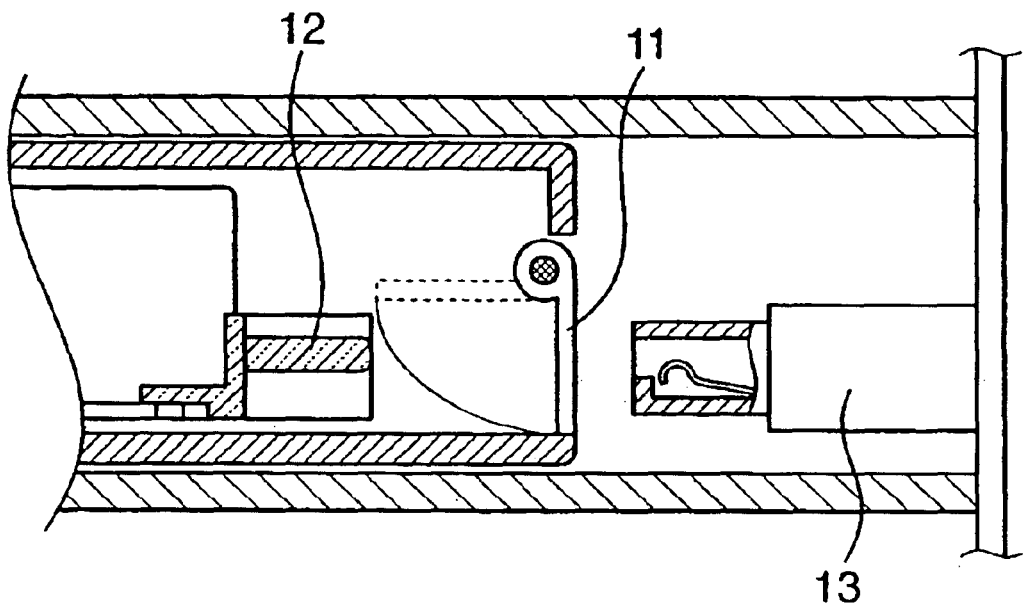
FIG. 13 is a sectional view showing a conventional shutter structure.
Figure 14:
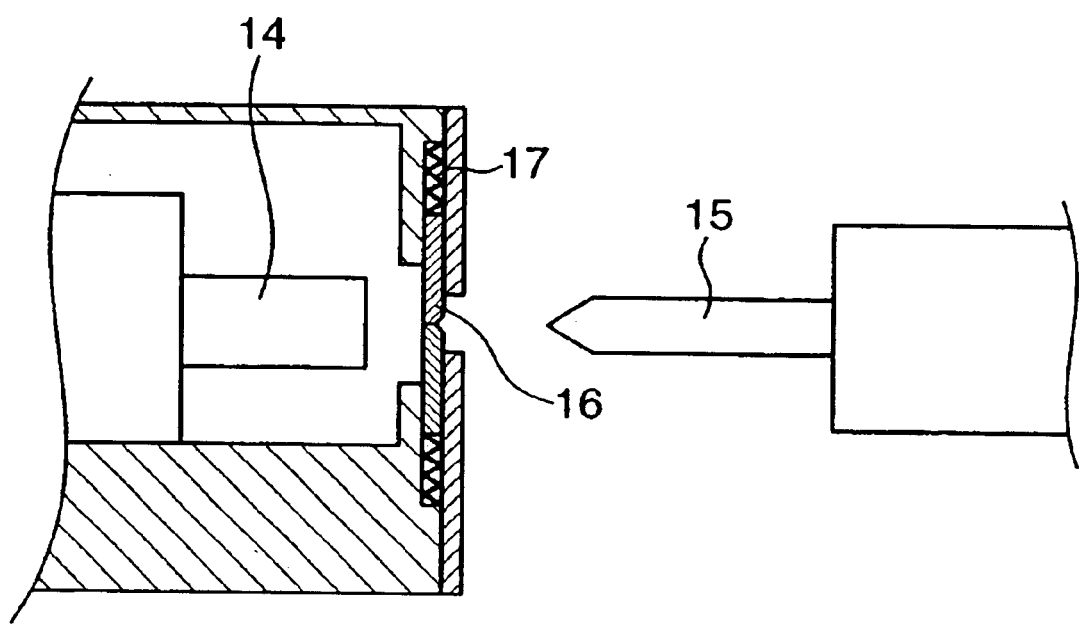
FIG. 14 is a sectional view showing another conventional shutter structure.

FIG. 12 shows the final mounting state wherein the electronic device 2 has been mounted at a predetermined position in the slot 3. In FIG. 12, the contacts 2da of the connector 2d arranged in the electronic device 2 and the contacts 9a of the receptacle connector 9 arranged in the electronic equipment main body 1 come into contact with each other, so that they are electrically connected. At this time, the shutter 4 is accommodated in the space between the connector 2d and housing 2e at least partly. This is the state where the substrate 10 is closest to the connector 2d. A signal from a conductive circuit formed on the substrate 10 is transmitted to the HDD 2c as the recording medium through the connectors 9 and 2d. The shutter 4 is retracted and is stored between the connector 2d and the housing 2e of the electronic device 2. Thus, the distance between the substrate 10 and connector 2d is not adversely affected by the shutter 4. Electrical connection can be made through the shortest path, so that an adverse influence such as impedance mismatch or radiation loss can be suppressed even in a signal that performs high-speed transmission.

When extracting the mounted electronic device 2 from the slot 3, the respective components follow a process opposite to that described above, and displace to the original initial state shown in FIGS. 7A and 7B from the state shown in FIG. 12. When the electronic device 2 is to be mounted and removed repeatedly, the same process will be repeated.

As described above, when the shutter mechanism of the electronic device 2 according to this embodiment is employed, the interface connector for the electronic device 2 can be arranged at a position close to the outer casing surface of the housing 2e, so that the fitting portion with respect to the opposite connector provided to the electronic equipment main body 1 can be made short. As a result, even when the shutter mechanism is employed for the interface connector of equipment that transmits a high-speed signal of several gigabits/sec or more, the transmission loss can be suppressed. Thus, this shutter mechanism is optimally used in equipment that is carried after it is removed from the main body. For example, the shutter mechanism has a pair of terminals for transmitting a first differential signal from an electronic device connector to an electronic equipment main body connector, and a pair of terminals for transmitting a second differential signal from the electronic equipment main body connector to the electronic device connector. Thus, a connector that can transmit a serial signal of at least 1 gigabit/sec or more can be used with no problem.

As the shutter 4 rotates outwardly to separate away from the electronic device 2, it can employ a stop structure which is adopted when a shutter is to be pushed inwardly for closing. When compared to a shutter mechanism that opens inwardly, the shutter 4 is strong against an external urging force and is strong against entering of a foreign substance or the like. The outer surface of the shutter 4 is set back from the outer surface of the housing 2e. Thus, when the electronic device 2 is to be extracted from the electronic equipment main body 1 and is to be handled alone, the shutter 4 will not easily receive a force in an unintended opening direction, and can maintain a stable closed state. Therefore, a lock mechanism that fixes the shutter 4 in the closed state also becomes unnecessary, leading to a shutter opening/closing structure having a simple structure. Furthermore, as the shutter is retracted and accommodated between the connector and the housing case, the housing case can be formed thin in a direction perpendicular to the mounting/removing direction of the connector. This is advantageous even when the present invention is to be utilized in equipment whose portability is the primary concern.

Although the storage medium is exemplified by a hard disk in the above description, the present invention is not limited to this. The present invention can also be applied to a storage medium that uses a magnetic material, a magneto-optical storage medium in which transition is caused between two states, i.e., magnetization state and non-magnetization state, by using a laser beam or the like, so that the magneto-optical storage medium is used as a storage medium, or a storage medium that uses a semiconductor memory such as a flash ROM which can hold its state even when it is not energized.

As has been described above, according to the present invention, an electronic device connector can be arranged at a position close to the casing of the housing while providing a shutter that protects the connector from the outside when the electronic device is removed from the main body equipment.

As many apparently widely different embodiments of the present invention can be made without departing from the spirit and scope thereof, it is to be understood that the invention is not limited to the specific embodiments thereof except as defined in the appended claims.

What is claimed is:

1. An electronic component storing case comprising:
    a case member capable of accommodating an electronic component and having an opening in a first end face thereof;
    a shutter member which is arranged in the opening of said case member, pivotal outwardly to open/close the opening, and biased in a closing direction by a first resilient member; and
    a lever member which has a first end extending to an outside of said case member from at least one side surface thereof perpendicular to said first end face of said case member, and a second end which acts on said shutter member, said lever member being adapted to convert an operating force to be applied to said first end into a biasing force for biasing said shutter member in an opening direction said operating force being caused by insertion of said case member into electronic equipment.

2. The case according to claim 1, wherein said shutter member in an open state is movable into said case member.

3. The case according to claim 1, wherein
    a groove is formed in at least one side surface perpendicular to said first end face of said case member to extend in a direction perpendicular to said first end face, and
    said first end of said lever member extends into the groove and actuates said first end outwardly from the groove, so that said second end of said lever member applies an operating force on said shutter member in the opening direction.

4. The case according to claim 3, wherein the groove serves as a guide when inserting said case member into electronic equipment.

5. The case according to claim 1, wherein said lever member is rotatably, axially supported in said case member, and said second end of said lever member displaces a to-be-operated portion projecting from a rotating shaft which rotates interlocked with said shutter member, so as to allow said shutter member to receive a force in the opening direction.

6. The case according to claim 5, wherein said rotating shaft has a flat plate-like rib extending from a shaft core, and said shutter member is supported by said rib, so as to allow said shutter member to rotate interlocked with said rotating shaft and move in a direction to be guided by a flat surface of said rib.

7. The case according to claim 6, further comprising a second resilient member which biases said shutter member, at least when said shutter member is open, in an outward direction of said case member along said flat surface of said rib,
    wherein said shutter member can move into said case member upon reception of an external force, perpendicular to said first end face, toward an interior of said case member.

8. The case according to claim 1, wherein when said shutter member is closed, an outer surface of said shutter member is flush with or set back from a surface formed by an end of a side surface that surrounds said first end face.

9. The case according to claim 1, wherein when said shutter member is closed, at least part of a side surface that surrounds said first end face projects from an outer surface of said shutter member.

10. An electronic device comprising:

an electronic component storing case according to claim 1; and an electronic component fixed in said case member such that a connecting connector thereof opposes said shutter member, wherein when said shutter member is open, said connecting connector is so exposed as to be able to be connected.

11. An electronic device comprising:

an electronic component storing case according to claim 2; and an electronic component fixed in said case member such that a connecting connector thereof opposes said shutter member, wherein when said shutter member is open, said connecting connector is so exposed as to be able to be connected, and said shutter member can be accommodated between said connecting connector and case member.

12. The device according to claim 11, wherein a direction of displacement of said shutter member into said case member substantially coincides with a direction of connection stroke for connection with an opposite connector to which said connecting connector is to be connected.

* * * * *